UNITED STATES PATENT OFFICE.

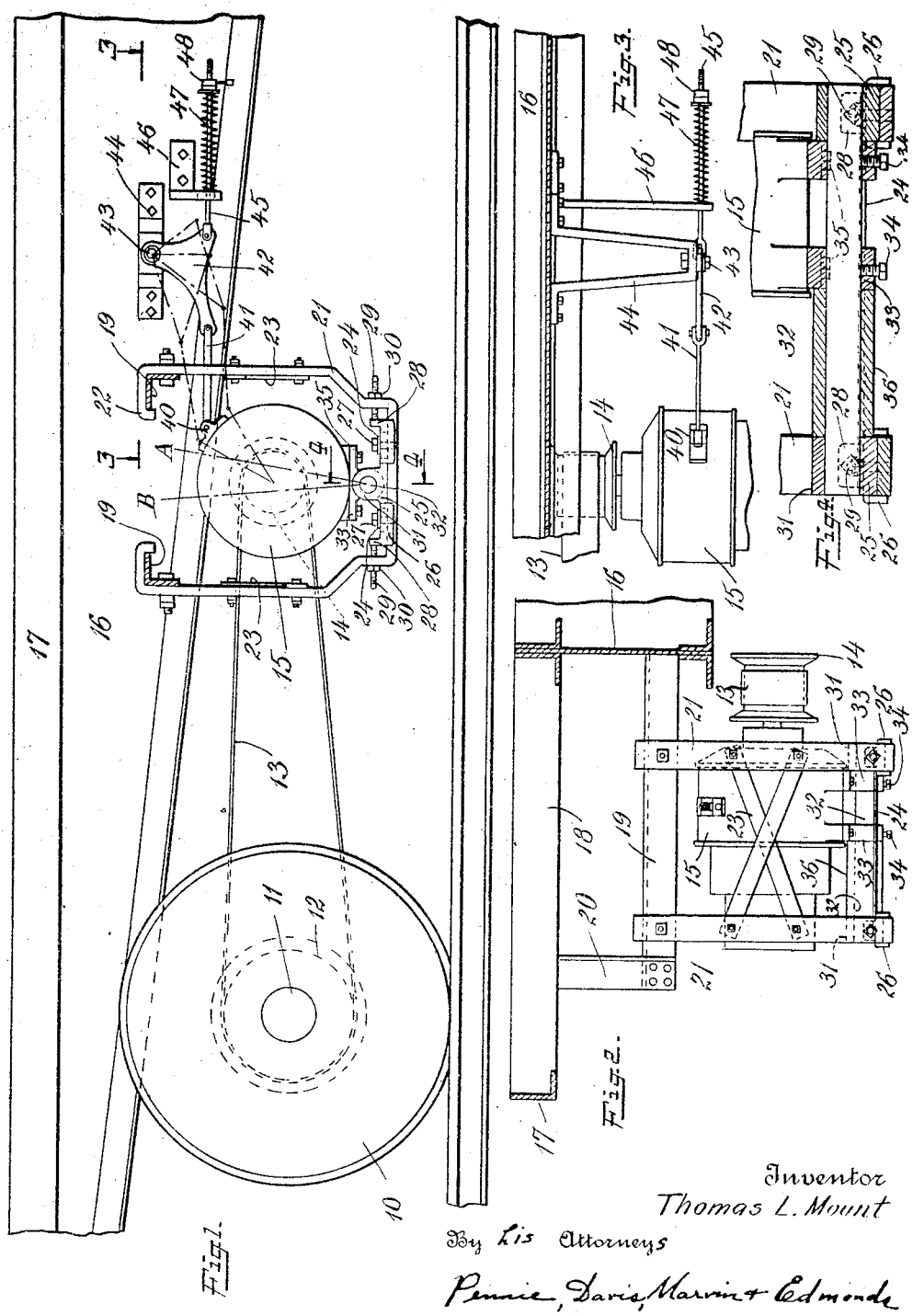

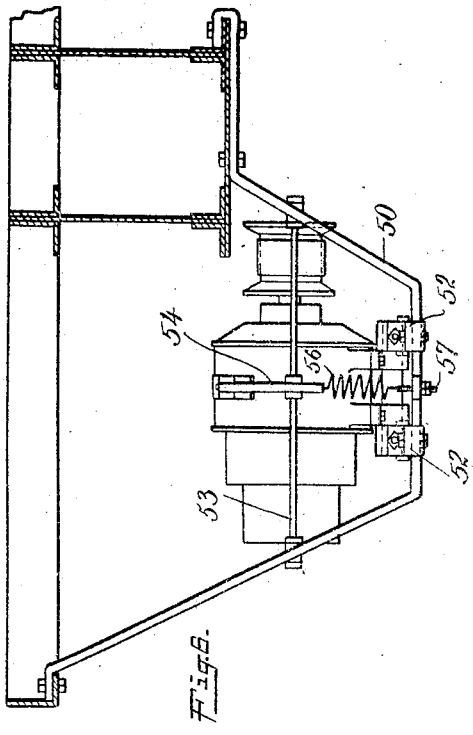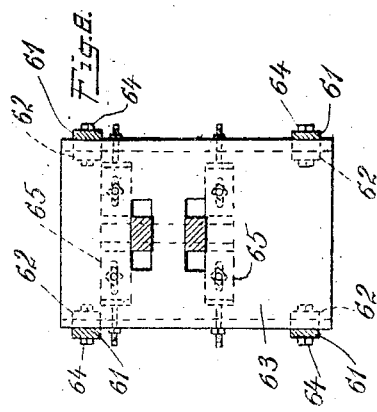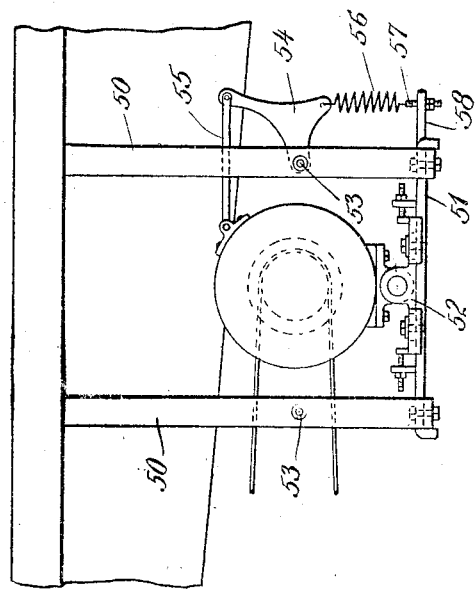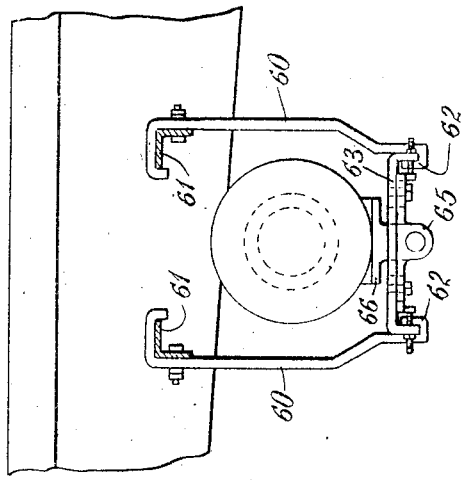

THOMAS L. MOUNT, OF PHILADELPHIA, PENNSYLVANIA.

GENERATOR SUSPENSION.

1,381,329.  Specification of Letters Patent.  Patented June 14, 1921.

Application filed June 19, 1918. Serial No. 240,823.

*To all whom it may concern:*

Be it known that I, THOMAS L. MOUNT, a citizen of the United States, residing at Philadelphia, in the county of Philadelphia, State of Pennsylvania, have invented certain new and useful Improvements in Generator Suspensions; and I do hereby declare the following to be a full, clear, and exact description of the invention, such as will enable others skilled in the art to which it appertains to make and use the same.

The present invention relates to apparatus for suspending an axle driven car lighting dynamo or similar piece of apparatus from the body of a car.

It is an object of the present invention to produce a suspension for this purpose which shall be of simple construction and light weight, and in which the driving belt will be maintained under substantially constant tension throughout all conditions of use, without the necessity of applying an excessive tension to maintain the dynamo in proper position, as is required in devices at present in use for suspending axle-driven dynamos from car bodies.

Another object of the invention is to provide a suspension of such a construction that there is no danger of the dynamo falling therefrom, if the means by which the dynamo is connected to the suspension breaks.

A further object of the invention is to provide a construction in which a new belt or a new tension spring may be easily and quickly applied with a minimum of manual effort, and without disturbing any of the other parts of the apparatus.

Other objects and advantages of the invention will be apparent from a detailed description of certain preferred embodiments of the same such as are shown in the accompanying drawings, in which Figure 1 is a side elevation of a portion of a car showing the invention applied thereto; Fig. 2 is an elevation at right angles to the view of Fig. 1, and in which some of the sills of the car frame are shown in cross-section; Fig. 3 is a plan view taken along the line 3—3 of Fig. 1; Fig. 4 is a sectional view of the bearing members along the line 4—4 of Fig. 1; Fig. 5 illustrates a modified form of the apparatus of Fig. 1; Fig. 6 is an end view of the apparatus of Fig. 5; Fig. 7 shows another modification; and Fig. 8 is a plan view of the base of the apparatus of Fig. 7.

Referring to the drawings, in which similar reference characters denote similar parts throughout the several views thereof, 10 indicates one of the car wheels, upon the axle 11 of which the car truck is mounted in the usual manner. Upon the axle 11 is a pulley 12 which by means of a belt 13 is connected to a pulley 14 of a car-lighting dynamo 15, or other piece of apparatus, adapted to be driven from the car axle. The center sill of the under frame is shown at 16. Parallel with this sill is a side sill 17 and between this sill and the center sill are transverse frame members 18. 19—19 represent base members preferably in the form of angle irons, having their inner ends permanently attached to the center sill 16, and their outer ends permanently attached to the frame members 18 by depending bars 20. The base members may be formed of other shapes and attached to the body of the car in any other convenient manner. Their exact location will depend upon the distance from the car axle at which the dynamo should be placed, and they should, of course, be arranged to clear any of the brake rigging or other mechanism in the vicinity of the truck. Suspended from the base members is a pair of bails 21 having their ends attached to the base members by bolts, but in order to insure that the bails shall remain upon the base members even if the bolts break or drop out, their ends are turned downwardly as at 22 to engage the inner edges of the base members. To brace the bails suitable cross bars 23 may be used, and also tie straps 24.

At the bottom of each bail is a bail shoe 25 provided with depending flanges 26 fitting over the sides of the bail. The body portion of the shoe is slotted to receive bolts 27 by which the shoe may be held in any desired position of adjustment upon the bail. Each shoe is provided with upturned ends 28 to receive set-screws 29, threaded through the upright portions of the bail. In order that the set-screws may be retained in any desired position of adjustment lock-nuts 30 are provided. These set-screws serve as additional means for retaining the shoes 25 in position, and are also convenient in making adjustments of the shoes with respect to the bails, but they may be omitted, as may also the slots in the shoes, the latter being then retained in one position upon the bails. Each shoe 25 is formed at its center with a lug 31 which serves as a bearing for a rocker shaft 32. Upon the shaft is mounted a rocker shoe 33 held in place by set-screws 34. The dynamo 15 is attached to the rocker shoe by bolts 35. Instead of the construction herein shown, the rocker shoe may consist of lugs integral with the dynamo casing, or formed in any other convenient manner. The bearings for the rocker shaft 32 may be lubricated by any of the usual devices for this purpose. As shown in Figs. 2 and 4 the dynamo is placed upon the shaft 32 in such a position that one of the rocker shoes lies adjacent one of the bail shoes, and a sleeve 36 surrounds the shaft 32 between the other rocker shoe and bail shoe. As appears from Fig. 2 the bails are so placed with respect to the dynamo that they lie well within the ends of the latter, so that if for any reason shaft 32, or any of the bearings break, the dynamo will be retained in the bails, and not fall upon the track where it might cause derailment of the train.

At the top of the dynamo casing is a lug 40 to which is attached one end of a link 41, the other end of which is attached to a triangular member or bell crank lever 42 pivoted at 43 to a bracket 44 projecting from and attached to the center sill 16. A rod 45 is attached to the lever 42 and passes through a bracket 46 attached to the center sill and serves as an abutment for one end of a spring 47 surrounding the rod 45, the other end of the spring being held by a loaded nut 48 threaded on the end of the rod.

Assume that the belt is of such a length that the dynamo occupies what will hereafter be called its normal position, which is that position in which its center of gravity is directly over the shaft upon which it is pivoted. Under these conditions the spring 47 will maintain a certain tension in the belt determined by the adjustment of the effect of the spring by means of nut 48. If during service, the belt stretches the spring will tend to draw the dynamo away from its normal position into a position indicated by broken line A in Fig. 1. Under these conditions the weight of the dynamo, as soon as it has been displaced from its normal position, will tend to produce additional tension in the driving belt, but at the same time the change in position of the dynamo will cause a lessening of the compression of spring 47.

While the effective length of the arm of lever 42 to which the link 41 is connected is increased, the effective length of the arm to which the rod 45 is attached is decreased, which in conjunction with the lessened effect of spring 47 will compensate for the increase in belt tension due to the weight of the dynamo, it being understood that the lever 42 is so designed with relation to the other parts of the apparatus that under these conditions the tension in the driving belt is substantially the same as that existing when the dynamo occupies its normal position.

If the belt is somewhat shorter, so that the dynamo cannot be drawn to normal position, but occupies a position as indicated by broken line B in Fig. 1, the dynamo would, if free to act, fall toward the car axle, thus decreasing the belt tension. Under these conditions, however, the spring will be further compressed so that its retractive effect is greater and it should be sufficiently greater to compensate for the lessened belt tension caused by the tendency of the dynamo to fall toward the car axle. In this case the effective length of the arm of lever 42 to which the link 41 is connected is decreased, but the effective length of the other lever arm is increased, and this action taken in connection with the increased effect of the spring causes substantially the same tension to be maintained in the driving belt as when the dynamo occupies its normal position.

The above description has been based upon the assumption that the distance between the car axle and the pivot point of the dynamo remains constant, as it does when the car is traveling on a straight track, but the same effect occurs if the distance varies, as it does when the car is passing around a curve. If the result of such a movement of the car is a displacement of the dynamo toward the car axle the compensating effect of the spring and lever will prevent any material change in the belt tension. Also at the time when a car is passing around a curve, the speed of the car will naturally be somewhat reduced, and if the curve be a sharp one the speed may be so low that the dynamo will not perform its normal function of generating current. Under these conditions the load on the driving belt will be considerably reduced, which thus tends to prevent an undue strain in the belt.

Figs. 5 and 6 represent a modification of the invention in which a different arrangement of supporting bails and spring is used. In these figures the bails 50 extend transversely of the car and are attached to the center sill and one of the side sills as shown most clearly in Fig. 6. Horizontal members 51 are attached to the bottoms of the bails, and upon these members are the bail shoes 52 corresponding to the bail shoes 25 of Fig. 1. Between the sloping sides of each bail are protecting rods 53. In this modification the compensating lever 54 is mounted upon one of the rods 53 and is connected to the dynamo by a link 55. In this case the spring 56 is a tension instead of a compression spring, and it is arranged vertically with its lower end attached to a retaining screw 57 passing through a bracket 58 projecting from the bottom of the bail. In case of breakage of any part the dynamo will fall into and be carried by the horizontal bars 51 and the rods 53 will prevent it from rolling out of the frame.

In the modification shown in Figs. 5 and 6 the same compensating effects take place under varying positions of the dynamo as in the case of the modification of Fig. 1. If the belt is of such length that the dynamo is displaced from its normal position, toward the car axle the spring 56 will be put under increased tension, thus compensating through the lever 54 for the tendency of the dynamo to fall toward the car axle. If on the other hand, the belt lengthens so that the dynamo tends to fall in an opposite direction from its normal position, the effect of the spring will be materially reduced, and through the changed relation of the lever arms will compensate for the increased belt tension produced by the effect of the weight of the dynamo.

In the modification shown in Figs. 7 and 8, four hangers 60 are attached to base members 61 corresponding to the members 19 of Fig. 1. The lower ends of these hangers are turned upward as at 62, and in the recesses thus formed are placed the downwardly turned edges of a supporting plate 63, bolts 64 being inserted for holding the plate in place. In this case the members 65 corresponding to the bail shoes of the other modifications are bolted to the under side of the plate 63, and slots are provided in the latter through which the lugs on the rocker shoes 66 pass. In case of breakage of any part of the support the dynamo will fall upon the plate 63. With this arrangement either the compensating lever and spring of Fig. 1 or that of Fig. 5 may be used, and therefore no particular form has been illustrated.

While the normal position of the dynamo has been referred to as the one in which the center of gravity of the dynamo is directly over the pivot point, it will be understood that the apparatus may be arranged so that under all conditions the belt will permit the dynamo to occupy a position corresponding to A in Fig. 1 or in which it may always occupy a forward position corresponding to B in this figure, but in either case the compensating lever and spring will cause substantially constant belt tension to be maintained throughout changes in position of the dynamo.

In Figs. 1 and 7 the bails and hangers have been shown as substantially vertical members, but it will be understood that they may be spread apart at the top and slope toward the base, to give greater rigidity in side stresses.

As contrasted with the usual forms of dynamo suspension in which the pivot point about which the dynamo swings is located above the dynamo, the present type of mounting possesses many advantages. If the pivot point is above the dynamo the latter will, under a relatively short belt, be drawn toward the car axle into such a position as to add the effect of its weight to the belt tension, but under these conditions the tensioning spring is usually arranged so that it will be drawn out or compressed as the case may be, so that it exerts an increased effect. On the other hand the minimum effect of the spring is exerted at a time when the belt has lengthened, so that the dynamo is drawn away from the car axle and its normal tendency is to fall toward the latter and decrease the belt tension. In order to overcome these contradictory effects various attempts have been made to devise apparatus in which the varying effect of the spring is offset by changes of the effective lever arm through which the spring acts upon the dynamo, but these devices have in practice proved unsatisfactory for the reason that even with this attempted compensation the spring tension must be so great in order to maintain the proper belt tension when the dynamo tends to swing away from the truck, due to a lengthened belt, that when the dynamo is drawn toward the truck as it is in going around a curve, the spring tension becomes excessive and in many cases causes breakage of the driving belt.

The present invention avoids all of these serious defects of devices now in use, and by a comparatively simple construction and the elimination of complicated systems of compensating levers and other arrangements enables a substantially constant tension to be maintained in the driving belt at all times, but never produces an excessive tension, even under those conditions of use where prior devices are most likely to fail.

While the invention has been described particularly with reference to an axle-driven car lighting dynamo, it will be understood that it is equally applicable to any other type of apparatus that may be driven from an axle or may be used for suspending a device which is to be used for imparting driving motion to an axle, such for instance as an electric motor.

It will also be understood that while the dynamo has been shown suspended to the under frame of a steel car, the invention is not to be limited to this construction, as the suspension may with slight modifications of the base members and the bails, be adapted for attachment to the under frames of wooden cars. Other changes may also be made in the details of the invention without departing from the principle thereof.

I claim:

1. A dynamo suspension comprising in combination, depending members attached to the bottom of a car, pivot members attached to the base of the depending members, a dynamo above and connected to the pivot members, a belt for driving the dynamo from the car axle, a spring, and a connection between the dynamo and the spring arranged to cause an increased effect to be exerted on the dynamo to overcome the lessened effect of its weight upon the tension of the belt as the dynamo swings toward the car axle and to exert a decreased effect when the dynamo swings away from the car axle and its weight becomes effective in producing belt tension, whereby the tension in the belt may be maintained substantially constant with changes in position of the dynamo with respect to the car axle.

2. A dynamo suspension comprising in combination, depending members attached to the bottom of a car, pivot members attached to the base of the depending members, a dynamo above and connected to the pivot members, a belt for driving the dynamo from a car axle, a spring, a lever pivoted to the bottom of the car and having one arm connected to the dynamo and the other arm connected to the spring, said lever and spring being so constructed and proportioned that when said dynamo tends to rotate about its pivot toward the car axle the effective length of the arm to which the dynamo is connected is decreased while the effective length of the arm to which the spring is connected, and the effect of the spring are both increased, while when the dynamo tends to rotate about its pivot away from the car axle, the effective length of the arm to which the dynamo is connected is increased and the effective length of the arm to which the spring is connected, and the effect of the spring are both decreased whereby compensation is obtained for the effect of the weight of the dynamo with changes in its position with respect to the car axle and the tension of the driving belt is maintained substantially constant.

3. Means for supporting a dynamo from the body of a car comprising in combination, a pair of depending bail members attached to the under frame of the car, a bail shoe adjustably attached to the lower horizontal portion of each bail member and provided with depending portions fitting over the bail member, a rocker shaft rotatably mounted in the bail shoes, a dynamo mounted upon and above the rocker shaft, a belt for driving the dynamo from a car axle, and a spring and compensating lever connected to the dynamo for maintaining substantially constant tension in the driving belt throughout changes in position of the dynamo with respect to the car axle.

4. Means for supporting a dynamo from the body of a car comprising in combination, a pair of depending bail members attached to the under frame of the car, cross braces between the bail members, a slotted bail shoe mounted upon the lower horizontal portion of each bail member, each of said shoes being formed with depending flanges fitting over the sides of the bail member, and upstanding lugs at its ends, adjusting screws passing through the bail members and engaging the lugs, retaining bolts passing through the slots in the bail shoes and into the bail members, a rocker shaft supported at its ends in the bail shoes, a rocker shoe mounted upon the rocker shaft, a spacing sleeve upon the rocker shaft, a dynamo mounted on the rocker shoe above the shaft, a belt for driving the dynamo from a car axle, and a spring and compensating lever connected to the dynamo for maintaining substantially constant tension in the driving belt throughout changes in position of the dynamo with respect to the car axle.

5. Means for supporting an axle-driven dynamo from the body of a car comprising in combination, base members attached to the under frame of a car, depending bail members attached to the base members, bail shoes adjustably attached to the lower portions of the bail members, a shaft mounted at its ends in the bail shoes, a dynamo mounted upon and above the shaft, a spring and a compensating lever connected between the spring and the dynamo for causing an increased effect to be exerted on the dynamo to overcome the lessened effect of its weight upon the tension of the belt as the dynamo swings toward the car axle and to exert a decreased effect when the dynamo swings away from the car axle and its weight becomes effective in producing belt tension, whereby the tension in the belt may be maintained substantially constant with changes in position of the dynamo with respect to the car axle.

6. A suspension for axle-driven dynamos comprising base members attached to the under frame of a car, depending members attached at their upper ends to the base members, supporting members connected between the lower ends of the depending members, shoes adjustably mounted on the supporting members, a rocker shaft supported at its ends in the shoes, a dynamo mounted on and above the rocker shaft, a spring, and a connection between the dynamo and the spring arranged to cause an increased effect to be exerted on the dynamo to overcome the lessened effect of its weight upon the tension of the belt as the dynamo swings toward the car axle and to exert a decreased effect when the dynamo swings away from the car axle and its weight becomes effective in producing belt tension, whereby the tension in the belt may be maintained substantially constant with changes in position of the dynamo with respect to the car axle.

In testimony whereof I affix my signature.

THOMAS L. MOUNT.